US011321877B1

(12) United States Patent
Mahyar et al.

(10) Patent No.: US 11,321,877 B1
(45) Date of Patent: May 3, 2022

(54) AUTOMATED SELECTION OF COLOR PALETTES FOR VIDEO CONTENT USING ARTIFICIAL INTELLIGENCE

(71) Applicant: Amazon Technologies, Inc., Seattle, WA (US)

(72) Inventors: Hooman Mahyar, Seattle, WA (US); Arjun Cholkar, Bothell, WA (US); Harshal Dilip Wanjari, Issaquah, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 92 days.

(21) Appl. No.: 17/000,585

(22) Filed: Aug. 24, 2020

(51) Int. Cl.
| | |
|---|---|
| *G06K 9/00* | (2022.01) |
| *G06T 7/90* | (2017.01) |
| *H04N 9/68* | (2006.01) |
| *H04N 9/64* | (2006.01) |
| *G06N 3/08* | (2006.01) |
| *G06K 9/62* | (2022.01) |
| *G06K 9/46* | (2006.01) |

(52) U.S. Cl.
CPC ............ *G06T 7/90* (2017.01); *G06K 9/00744* (2013.01); *G06K 9/4652* (2013.01); *G06K 9/6256* (2013.01); *G06N 3/08* (2013.01); *H04N 9/646* (2013.01); *H04N 9/68* (2013.01)

(58) Field of Classification Search
CPC ............ G06F 16/5838; G06F 16/5862; G06K 9/4652; G06K 9/4661; G06K 9/6215; G06K 2209/19; G06K 9/4642; G06K 9/6212; G06K 9/6267; G06K 9/00973; G06T 7/90; G06T 7/44; G06T 2207/20084; G06T 5/10; G06T 9/00973; G06T 2207/20081; G06N 3/084; G06N 3/04; G06N 3/08
See application file for complete search history.

(56) References Cited

U.S. PATENT DOCUMENTS

| | | | | |
|---|---|---|---|---|
| 10,257,563 | B2 * | 4/2019 | Cowburn | H04N 21/8549 |
| 10,455,297 | B1 * | 10/2019 | Mahyar | G10L 15/1815 |
| 10,721,519 | B2 * | 7/2020 | Cowburn | H04N 21/23418 |
| 2012/0027252 | A1 * | 2/2012 | Liu | G06K 9/00355 382/103 |
| 2017/0308754 | A1 * | 10/2017 | Torabi | G06K 9/00744 |
| 2019/0005361 | A1 * | 1/2019 | Cho | G06T 7/20 |
| 2019/0384987 | A1 * | 12/2019 | Li | G06K 9/00744 |
| 2020/0135052 | A1 * | 4/2020 | Singh | G06T 19/20 |

\* cited by examiner

*Primary Examiner* — Duy M Dang
(74) *Attorney, Agent, or Firm* — Eversheds Sutherland (US) LLP

(57) ABSTRACT

Systems, methods, and computer-readable media are disclosed for systems and methods for automated selection of color palettes for video content. Example methods may include determining, by one or more computer processors coupled to memory, a first segment of video content, the first segment comprising a first set of frames, determining, using a first video processing algorithm, a first object that is present in the first set of frames, and determining, using a second video processing algorithm, a first semantic characteristic of the first segment. Some example methods may include generating a first vector representing the first object and the first semantic characteristic, and generating, using a first neural network and the first vector, a first color palette recommendation for the first segment. Selection of the first color palette recommendation may cause a color filter to be applied to the first set of frames.

20 Claims, 6 Drawing Sheets

AUTOMATED SELECTION OF COLOR PALETTES FOR VIDEO CONTENT USING ARTIFICIAL INTELLIGENCE

BACKGROUND

Certain digital content, such as movies, television shows, and other video content may include color filtering or other post-processing of video footage that modifies an appearance of the video content when viewed by users. For example, coloring or application of color filters to video content may be used to make video appear a certain color, or other filters, such as grainy filters, may cause other changes to video content. Color and other filters may be used by content producers to convey various characteristics associated with the video content, such as emotion. However, post-processing of video content may be time-consuming and expensive. Moreover, the presentation of available options for post-processing may be cumbersome due to the number of options. Accordingly, automated selection of color palettes for video content may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
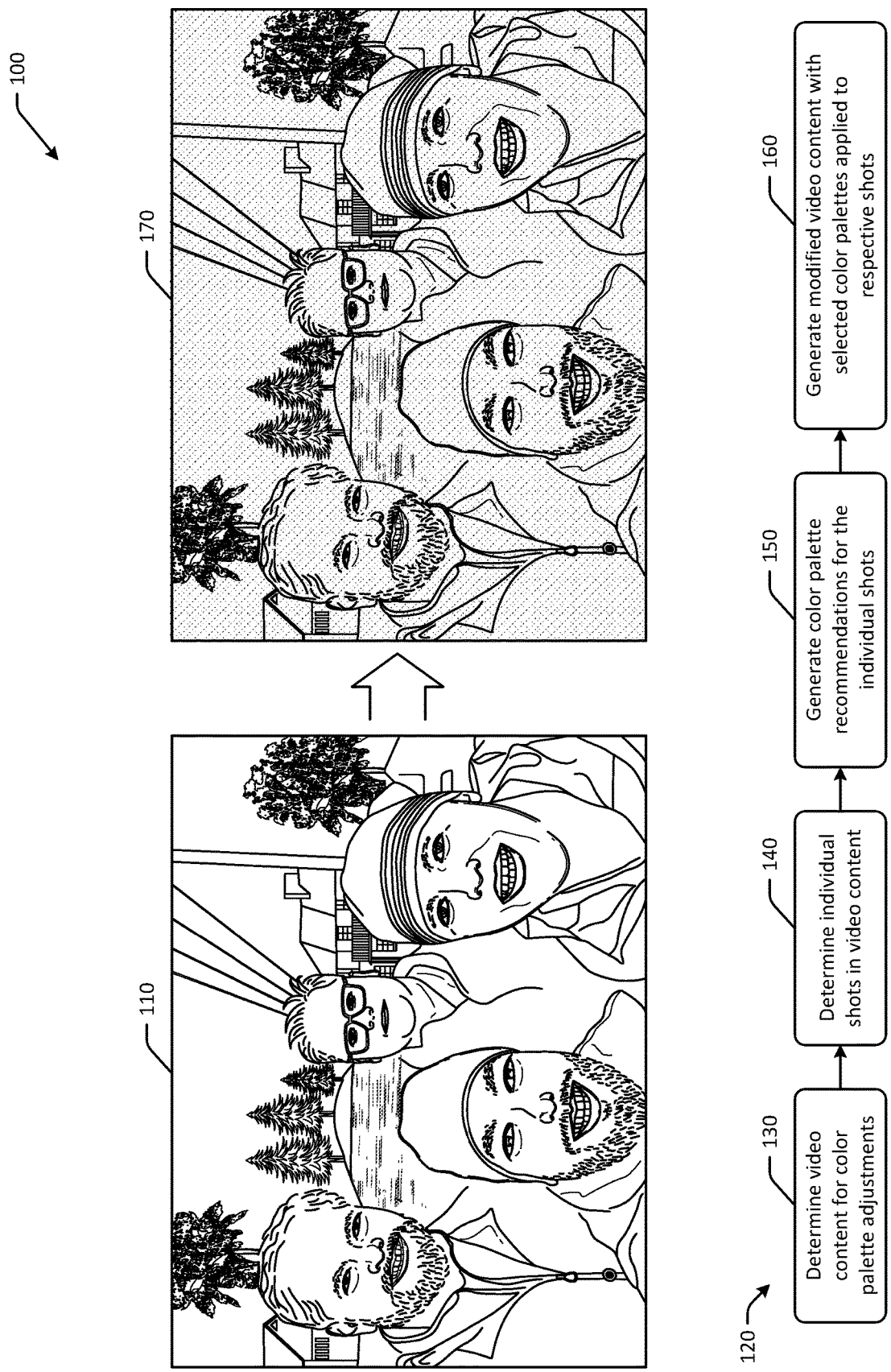
FIG. 1 is a schematic illustration of an example use case for automated selection of color palettes for video content in accordance with one or more example embodiments of the disclosure.

Digital content may include video content, such as movies, television shows, streaming shows (e.g., made for Amazon Prime, Netflix, etc.), and other video content. During production of digital content, such as video content, footage that is captured may be post-processed. Post-processing may be an expensive and time consuming process. For example, each shot or scene in the video content may have one or more color palettes, such as color filters (e.g., sepia, red filters, blue filters, etc.), monochromatic filters, color correction filters, color grading filters, tint filters, slick filters, grainy filters, saturated filters, and/or other color palettes, applied to the individual segment of video. For example, a sepia color palette or a grainy filter color palette may convey a flashback scene. The color palette may help visually communicate aspects of the video, such as emotion, and may therefore improve a user experience when viewing the content (e.g., color may be used to guide a viewer's emotions through color, light, composition, movement, etc.). The process of manually selecting and applying color palettes to segments of video may increase production time and cost. In addition, color can affect users emotionally and psychologically. Color in film can build harmony or tension within a scene or bring attention to a key theme.

Embodiments of the disclosure utilize artificial intelligence to generate color palette recommendations for segments of video content, such as movies, and automatically apply selected color palettes to video content to reduce post-processing time and cost. Embodiments may automatically select the best color palette for each scene and shots. Some embodiments may generate a variety of options for the content producer or other user by automating the end-to-end process. Embodiments of the disclosure include systems and methods to automatically generate color palette recommendations for video content. Instead of manual curation and selection of color palettes, embodiments of the disclosure may automatically analyze video and/or audio associated with certain content, and generate color palette recommendations. Embodiments may determine subsequent color palette recommendations based on previous user selections to provide a cohesive feel to the entire video content.

In some embodiments, content may be separated into segments using one or more video processing algorithms, text processing algorithms, and/or audio processing algorithms to identify and/or determine scenes that may take place in various portions of the content. The identified segments may be analyzed to determine individual color palette recommendations for the segments (which may or may not be the entire movie or other content).

This disclosure relates to, among other things, devices, systems, methods, computer-readable media, techniques, and methodologies for automated selection of color palettes for video content. Certain embodiments may automatically generate color palette recommendations for digital content, such as video content (e.g., movies, television programs, streaming content, etc.), based at least in part on analysis of individual frames of video content, and/or analysis of audio segments. Certain embodiments determine aspects of video content using neural network(s) and/or machine learning and other methodologies. In some instances, machine learning (e.g., deep neural networks, long short term memory units and/or recurrent neural networks, etc.) may be used to identify various elements of video frames that may be used to generate color palette recommendations. Some embodiments may implement deep visual understanding to annotate all video content, such as objects, faces, indoor location detection, outdoor location detection, actions, scenes, shot size, camera motion, and/or other features. The features may be used to generate a vector. The vector can be used to generate color palette recommendations. Extracted information (which may be in the form of a vector), plus optional metadata such as genre, content classification labels, and other metadata, may be compared to a content color palette graph. For example, a vector of (Action, Head Shot, Cold, Tree, Man, Sunrise, Winter) may be associated with Color Palette 786 (or another identifier) in the color palette graph.

In an example embodiment, a deep neural network may be built to generate one or more color palette recommendations for a segment of video. Individual color palette recommendations may be generated for some or all frames or segments of the video content. Some embodiments may include facial recognition processing, object detection processing, and/or other video processing models to generate high quality data for individual shots or scenes in content. Embodiments of the disclosure may therefore reduce manual effort in generating and/or selecting color palettes for various shots of video content by automatically generating relevant and accurate color palette recommendations that were previously unable to be generated by computers due to a lack of knowledge of the correlation between color palette selection and semantic characteristics and/or other features of video content.

Referring to FIG. 1, an example use case 100 for automated selection of color palettes for video content is depicted in accordance with one or more example embodiments of the disclosure. In the example of FIG. 1, video content may include multiple frames, such as a first frame 110. The first frame 110 may be unfiltered or may be in post-processing. For example, the first frame 110 may be raw footage. The first frame 110 may be part of a scene in broader video content, and may correspond to a segment of the video content. The broader video content may be processed to identify discrete shots or scenes in the video content, and the corresponding segments of video may be extracted from the video content. The extracted segments may be processed using one or more video processing algorithms to determine features of the segment for inclusion in a vector. For example, the first frame 110 may be processed, along with other frames in the segment, to determine that the segment includes four males in an outdoor scene with snow and mountainous terrain, with facial sentiment of adventure. Such features and/or other features may be determined and used to generate a vector for the segment. The vector may be used to determine a color palette that should be applied to the segment. For example, a color palette with a bluish hue may be applied to the segment. In the example of FIG. 1, a modified first frame 170 with the color palette applied is depicted. In some embodiments, color palette recommendations may be presented to a user, such as a cinematographer, for selection and/or approval and subsequent application, whereas in other embodiments, a color palette may be automatically applied to the segment.

To generate color palette recommendations and/or modified video content, some embodiments may include a content processing engine. The content processing engine may include one or more neural networks that may be used to analyze the respective frames and to generate a corresponding color palette recommendation. The content processing engine may therefore optionally extract the frames from the video content. Using one or more image processing algorithms, the content processing engine may detect or otherwise determine objects that appear in the respective frames, actions that occur in the video segment corresponding to a scene, and/or faces that appear in the frames. Based at least in part on the analysis of the individual frames, the content processing engine may generate a color palette recommendation for a video segment. The content processing engine may generate a vector that combines the detected features of the video content that can be used to determine a corresponding color palette recommendation using a color palette graph or other database. The content processing engine may input the vector into a second neural network, such as a three-dimensional temporal neural network. The second neural network may output a color palette recommendation for the scene or portion of the scene.

To generate color palette recommendations for video content, an example process flow 120 is presented and may be performed, for example, by one or more content processing or video content generation engines at one or more remote servers. The remote server and/or computer system may include at least one memory that stores computer-executable instructions and at least one processor configured to access the at least one memory and execute the computer-executable instructions to perform various actions or operations, such as one or more of the operations in the process flow 120 of FIG. 1.

At a first block 130, video content for color palette adjustments may be determined. For example, frames may be extracted from video content. For example, the content processing engine may extract frames from video content. The frames may be raw footage or may not have been post-processed.

At a second block 140, individual shots in the video content may be determined. For example, the video content may be separated into discrete shots or scenes, with video segments corresponding to the shots being identified by timestamps and optionally extracted.

At a third block 150, color palette recommendations for the individual shots may be determined. For example, various video processing algorithms may be used to determine features of the respective shots. Features may include objects, actions, and faces may be detected in the shots. The features may be used to generate a vector for the segment. For example, a remote server may determine a movie file having video data. The remote server may extract a first video segment from the video data, the first segment having a first frame and a second frame. The remote server may determine, using a first neural network, a first action that occurs during the first segment, and may determine, using one or more object recognition algorithms, a first object that appears in the first frame. The remote server may determine, using a video processing algorithm, a first semantic characteristic of the first segment, such as a location at which the shot takes place, whether or not the scene is a flashback, and so forth. The remote server may generate, using a second neural network, a vector representing the first action, the first object, and the first semantic characteristic. The vector may be used to determine a corresponding color palette recommendation. For example, the remote server may generate, using a third neural network and optionally a color palette graph, a first color palette recommendation for a first color filter palette to apply to the first segment based at least in part on the first vector, as well as an optional second color palette recommendation for a second color filter palette to apply to the first segment based at least in part on the first vector.

At a fourth block 160, modified video content with the selected color palettes applied to the respective shots may be generated. For example, the first frame 110 may be modified via application of a selected color palette to generate the modified first frame 170. For example, if the remote server determines a selection of the second color palette recommendation, a movie file with the second color filter palette applied to the first segment may be generated. In some embodiments, an updated training dataset based at least in part on the selection of the second color palette recommendation may be generated, and the updated training dataset may be used to retrain the third neural network.

Embodiments of the disclosure may include automated selection of color palettes for video content, and may include one or more modules that can be used to analyze digital content. Certain embodiments may use one or more detection modules or algorithms (e.g., object recognition modules, pattern recognition algorithms, etc.) to identify or detect the presence of one or more features in the content. Features may include, for example, the presence of certain objects, the occurrence of certain actions or events, certain sounds in an audio file or audio component of the content, certain language in a text file or text component of the content, and so forth. One or more detection modules may be used to process and/or detect various features in the content. In some instances, a module may perform more than one form of analysis.

Example embodiments of the disclosure provide a number of technical features or technical effects. For example, in accordance with example embodiments of the disclosure, certain embodiments of the disclosure may automatically analyze audio, video, and/or text components of content. Certain embodiments may generate color palette recommendations for various scenes of video content. Certain embodiments may recognize or identify presence of certain objects and/or presence of certain themes or types of content and may use one or more machine learning modules or algorithms. As a result of improved functionality, color palette recommendations for video may be generated. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
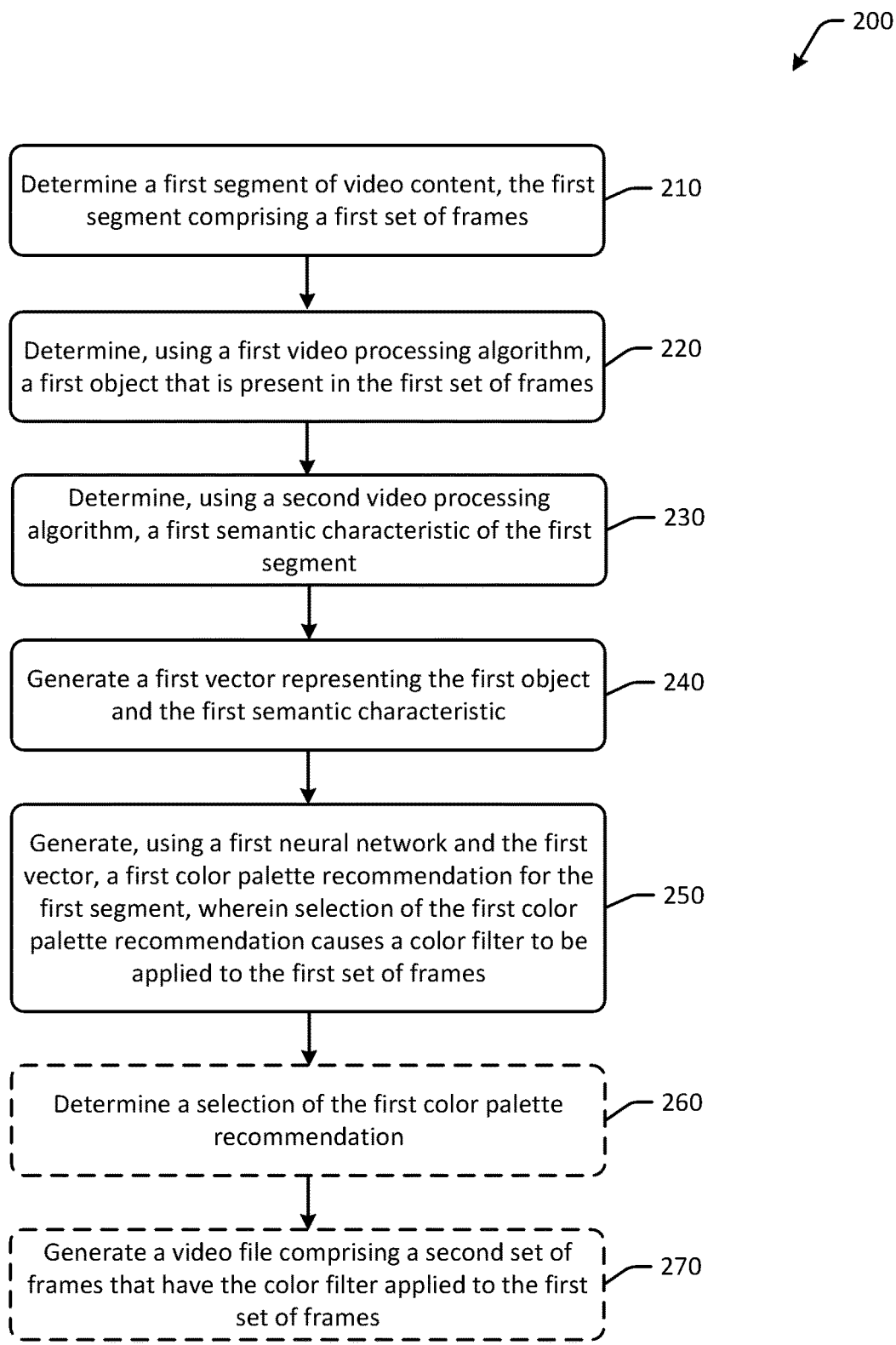
FIG. 2 is a schematic illustration of an example process flow for automated selection of color palettes for video content in accordance with one or more example embodiments of the disclosure.

FIG. 2 depicts an example process flow 200 for automated selection of color palettes for video content in accordance with one or more example embodiments of the disclosure. While example embodiments of the disclosure may be described in the context of movies and video, it should be appreciated that the disclosure is more broadly applicable to any type of digital content. Some or all of the blocks of the process flows in this disclosure may be performed in a distributed manner across any number of devices. The operations of the process flow 200 may be optional and may be performed in a different order.

At block 210 of the process flow 200, computer-executable instructions stored on a memory of a device, such as a remote server or a user device, may be executed to determine a first segment of video content, the first segment comprising a first set of frames. For example, a content processing engine and/or one or more video processing modules at a remote server may determine a first segment of video content, the first segment comprising a first set of frames. The first segment may be a video segment of video content, and may be associated with text and/or audio components. The first segment may be a continuous segment or non-continuous segments that are related. For example, a scene in the content may be interrupted by a flashback or other scene, and may subsequently resume. Segments may correspond to events, scenes, and/or other occurrences that may be discrete and/or extractable from the content. In some instances, segments may correspond to certain locations and/or times, certain actors that appear, certain music or sounds, and/or other features of the content. For example, the remote server may determine a first clip or a first segment of a movie using content data associated with the movie, such as video analysis data. The first clip may be a continuous portion of the movie corresponding to a first scene of the movie that occurs from a first timestamp to a second timestamp. The content scanning engine of the remote server may determine the respective timestamps for segments. Some segments may have more than one set of start and stop timestamps. For example, a scene may be interrupted and then resume later, in which case there may be more than one pair of start and stop timestamps.

To determine the first segment, the remote server may extract and/or analyze individual frames of video content to determine whether the frames are part of the same segment or a different segment. Analysis of frames may include processing images using one or more object recognition algorithms, determining pixel color values, comparing certain portions of frames to previous or subsequent frames in the video, and the like. In one example, an automobile object recognition algorithm may be used to determine that there is a car present in a first frame of a video. In another example, a firearm detection module or algorithm may be used to determine that gun violence or a firearm is present in a first frame of a video. One or more object recognition algorithms may be used on individual frames or sets of frames in a video. The determined objects or features may be outputs of the respective modules or algorithms.

In some embodiments, the remote server may determine a movie file that includes video data and audio data. The remote server may extract a first video segment from the video data, where the first segment comprising a first frame and a second frame, and first audio content.

At block 220 of the process flow 200, computer-executable instructions stored on a memory of a device, such as a remote server or a user device, may be executed to determine, using a first video processing algorithm, a first object that is present in the first set of frames. For example, the content processing engine and/or one or more video processing modules at a remote server may determine, using a first video processing algorithm, a first object that is present in the first set of frames. Objects may be determined based at least in part on analysis or processing of individual frames of video content. For example, object recognition algorithms may be used to process some or all of the frames of a video segment (e.g., every other frame may be processed to reduce computational load and cost, etc.) to detect objects present.

At block 230 of the process flow 200, computer-executable instructions stored on a memory of a device, such as a remote server or a user device, may be executed to determine, using a second video processing algorithm, a first semantic characteristic of the first segment. For example, the content processing engine and/or one or more video processing modules at a remote server may determine, using a second video processing algorithm, a first semantic characteristic of the first segment. Semantic characteristics may include actions or events that occur during the segment, whether the segment occurs indoors or outdoors, whether or not the scene is a flashback, a location at which the events take place in the segment, and so forth.

Actions or events may be determined based at least in part on objects that are present in video content and/or human poses or activities that occur during scenes across multiple frames. For example, an action and/or human pose detection module may be used to analyze the video and/or audio of the content in a frame-by-frame or segment-by-segment analysis to detect the presence or occurrence of human actions. Certain embodiments may include a facial recognition module that may be used to analyze video and/or audio of the content in a frame-by-frame or segment-by-segment analysis to detect the presence of characters in frames or scenes. The first neural network may be a two-dimensional convolutional neural network in some embodiments.

At block 240 of the process flow 200, computer-executable instructions stored on a memory of a device, such as a remote server or a user device, may be executed to generate a first vector representing the first object and the first semantic characteristic. For example, the content processing engine and/or one or more neural networks at a remote server may generate a first vector representing the first object and the first semantic characteristic. For example, the vector may incorporate the data captured using the frame analysis and/or other video processing. In some embodiments, a single vector may be generated, whereas in other embodiments, more than one vector may be generated. The vector may incorporate the detected features for a video segment, or a set of multiple frames. Vectors may be two dimensional representations of the features detected in the video segment.

At block 250 of the process flow 200, computer-executable instructions stored on a memory of a device, such as a remote server or a user device, may be executed to generate, using a first neural network and the first vector, a first color palette recommendation for the first segment, wherein selection of the first color palette recommendation causes a color filter to be applied to the first set of frames. For example, a content processing engine and/or one or more neural networks at a remote server may generate, using a first neural network and the first vector, a first color palette recommendation for the first segment, wherein selection of the first color palette recommendation causes a color filter to be applied to the first set of frames. The vector may be input at the neural network, and the corresponding first color palette recommendation may be output. To generate the first color palette recommendation, the neural network may be a three-dimensional convolutional neural network, and may use the first vector to determine a color palette recommendation. In some embodiments, the first color palette recommendation may be generated using a color palette graph or other database that includes data points on vectors and actually selected color palettes. The first color palette recommendation may be a recommendation for a certain type of color palette or certain filter to apply to the video segment. The first color palette recommendation may be associated with a certain confidence score indicative of a likelihood that the first color palette recommendation will be selected for application.

In some embodiments, audio content associated with the content may be used in addition to, or instead of, text content to determine sentences that occur in a segment. For example, a remote server may analyze an audio file corresponding to a video. The audio file may include audible sounds, such as dialog, sound effects, soundtrack music, and the like corresponding to the video component of the video. For example, audio may be processed to extract dialog (e.g., filtered to remove sound effects, music, etc.), and the extracted dialog may be processed using speech-to-text processing algorithms. The output may be processed using natural language processing. In an example, an audio processing module may be used to determine the presence of dialog, sound effects, and other instances of audio events that may be used to determine themes of content in a segment. For example, the audio processing module may parse or segment audio associated with the content and identify events or instances of certain indicators or occurrences, such as ocean waves, fire trucks, ambulances, screams, and other audio that may be indicative of actions or events occurring during the segment.

At optional block 260 of the process flow 200, computer-executable instructions stored on a memory of a device, such as a remote server or a user device, may be executed to determine a selection of the first color palette recommendation. For example, a user may select the first color palette recommendation, and the content processing engine may receive or otherwise determine the selection of the first color palette recommendation for application of the first color palette to the video segment.

In some embodiments, different neural networks may be used for analyzing frames, generating vectors, and generating color palette recommendations. In other embodiments, the same neural networks may be used for one or more of these tasks.

At optional block 270 computer-executable instructions stored on a memory of a device, such as a remote server or a user device, may be executed to generate a video file comprising a second set of frames that have the color filter applied to the first set of frames. For example, a video content generation engine at a remote server may be configured to generate a video file comprising a second set of frames that have the color filter applied to the first set of frames. The video file may include the modified video segment with the color palette or other filter applied to the video segment.

Figure 3:
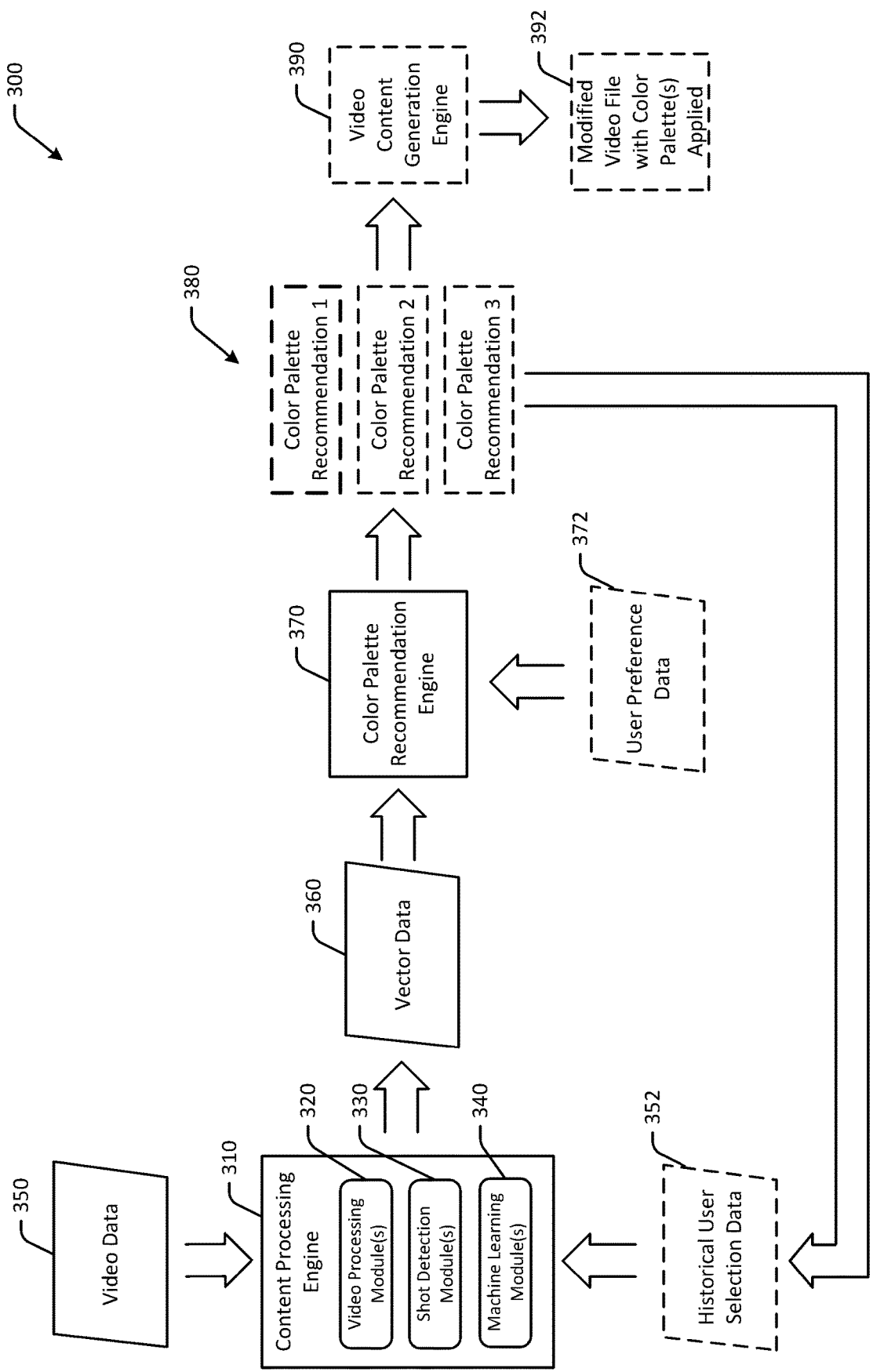
FIG. 3 is a schematic illustration of an example data flow for automated selection of color palettes for video content in accordance with one or more example embodiments of the disclosure.

FIG. 3 is a schematic illustration of an example data flow 300 for automated selection of color palettes for video content in accordance with one or more example embodiments of the disclosure. Different embodiments may include different, additional, or fewer inputs or outputs than those illustrated in the example of FIG. 3.

In FIG. 3, an example data flow 300 is schematically depicted. A content processing engine 310 and/or one or more content scanning module(s) may be configured to detect or determine one or more features present in digital content, such as audio, video, and/or text content. The content processing engine 310 may be stored at and/or executed by one or more remote servers. The content processing engine 310 may include one or more modules or algorithms, and may be configured to identify or determine the presence of one or more features in digital content.

For example, the content processing engine 310 may include one or more video processing modules 320, one or more shot detection modules 330, and/or one or more machine learning module(s) 340. Additional or fewer, or different, modules may be included. The video processing module(s) 320 may be configured to process and/or analyze video content. For example, the video processing module(s) 320 may be configured to determine frames or sets of frames of video content and may be configured to detect certain features, such as certain objects, as well as actions or events across multiple frames. For example, a video file for a movie may include a first frame, a second frame, and so forth. The video processing module(s) 320 may be configured to detect or analyze frames in video content to determine which frames correspond to the same scene. For example, the video processing module(s) 320 may include facial recognition and/or human pose detection algorithms that can be used to identify people or actions in certain locations over frames or segments of the video content, which may not always be consecutive. For example, a scene may be briefly interrupted by a flashback or cut to a different story, and may resume thereafter. Video processing module(s) 320 may include one or more object recognition algorithms configured to detect at least one of predefined objects, predefined scenery (e.g., certain locations, etc.), and the like. The video processing module(s) 320 may be configured to detect color palettes in video content for neural network training datasets. The video processing module(s) 320 may be configured to generate one or more vectors representing characteristics of shots or scenes of video content.

The shot detection module(s) 330 may be configured to process and/or analyze video content to determine where a certain shot or scene starts or ends in the video content. In some embodiments, the shot detection module(s) 330 may be configured to analyze audio content, such as audible dialog, sound effects, music, and other audio. In some instances, the shot detection module(s) 330 may be configured to extract segments of video from larger files, such as movie files, for further processing.

The machine learning module(s) 340 may be configured to analyze and/or process frames and/or video segments. The machine learning module(s) 340 may include a first neural network configured to generate color palette recommendations for individual video segments of video content. The machine learning module(s) 340 may include a second neural network configured to generate vectors that represent determined characteristics of video segments and/or corresponding frames.

The content processing engine 310 may receive one or more inputs for content for which color palette recommendations are to be generated. For example, the content processing engine 310 may receive one or more of video data 350 associated with content for which color palette recommendations are to be generated, and may optionally receive historical user selection data 352 associated with content for which color palette recommendations are to be generated. In some embodiments, the video data 350 may be extracted from a content file. The historical user selection data 352 may be data related to color palette selections for other segments of the same content, and can be used to improve the accuracy of subsequent color palette recommendations. For example, as a user selects color palettes for segments of video content, color palette recommendations for other portions or segments of the same content can be improved based on the user selections, and a cohesive feel may be provided for the entire video content. In some embodiments, color palette recommendations may be automatically selected and applied without user input, so as to take an unprocessed video file as an input, and output a processed video file with color palettes applied to the individual shots or segments.

The content processing engine 310 may process the respective data associated with the content for which color palette recommendations are to be generated. For example, the video data 350 may be processed using one or more of the video processing module(s) 320, the shot detection module(s) 330, and/or the machine learning module(s) 340. Likewise, the optional historical user selection data may be processed using one or more of the modules or algorithms of the content processing engine 310.

Using one or more algorithms or modules, the content processing engine 310 may determine the presence of one or more types of objects, faces, and/or scenes in the content, and may output vector data 360. The vector data 360 may include one or more vectors that represent the features of the frames that form a video segment. For example, a video segment of 10 seconds may have 30 frames, and features detected in some or all of the 30 frames may be aggregated and used to generate a vector that may be included in the vector data 360. Video content may include more than one vector for various video segments of the video content.

The vector data 360 may be input at a color palette recommendation engine 370. The color palette recommendation engine 370 may be configured to generate color palette recommendations for video segments using the vector data 360. For example, the color palette recommendation engine 370 may generate a first color palette recommendation using a first vector, and a second color palette recommendation using a second vector of the vector data 360. The color palette recommendation engine 370 may use one or more neural networks to generate color palette recommendations.

In some embodiments, the color palette recommendation engine 370 may aggregate color palette recommendations for multiple video segments, and may consolidate the color palette recommendations to generate a set of color palette recommendations that is applicable to the entire video. In some embodiments, optional user preference data 372 may be input at the color palette recommendation engine 370. User preference data 372 may include data related to a particular user preference regarding color palette selection and may be used to improve color palette recommendations. For example, if a director prefers certain hues or shades of color (as determined based at least in part on historical film data associated with the user, etc.), or certain filters, those preferences may be used to modify confidence values for associated color palette recommendations. In some embodiments, the color palette recommendation engine 370 may determine user preferences 372 associated with a user account, and may use the user preferences to generate the first color palette recommendation.

In some embodiments, the color palette recommendation engine 370 be in communication with color palette graph data. Color palette graph data may a table, graph, or other association between vectors and color palette selections of existing video content used as a training dataset. Over time, the color palette graph data may be updated to include user selections of color palette recommendations. For example, the color palette graph data may include vector features for certain scenes in content, and the associated color palettes or filters that were applied to the respective scenes.

The color palette recommendation engine 370 may output one or more color palette recommendations 380. For example, the color palette recommendations 380 may include a first color palette recommendation, a second color palette recommendation, a third color palette recommendation, and so forth. One or more color palette recommendations 380 may be output. In some embodiments, individual color palette recommendations may be associated with respective confidence scores indicating a likelihood that the color palette recommendation will be selected for application. A confidence score threshold may be used to determine how many color palette recommendations are presented to a user. For example, color palette recommendations associated with confidence scores at or greater than a confidence score threshold of 70% or another value may be presented. If there are multiple recommendations that satisfy the threshold, multiple recommendations may be presented. For example, the color palette recommendation engine 370 may generate, using the first neural network, the first vector, and an optional color palette graph (e.g., a graph or table generated using one or more training datasets, etc.), a second color palette recommendation for the first segment, and may generate, using the first neural network, the first vector, and optionally the color palette graph, a third color palette recommendation for the first segment. The color palette recommendation engine 370 may cause presentation of the first color palette recommendation, the second color palette recommendation, and the third color palette recommendation at a user interface. The color palette recommendation engine 370 may generate a confidence score for the first color palette recommendation, and may determine that the confidence score satisfies a confidence score threshold.

A user may select one of the color palette recommendations 380 or a different color palette for application to a particular video segment. For example, the user may select Color Palette Recommendation 1 in the example of FIG. 3. The selection may be part of the historical user selection data 352 and may be used to improve color palette recommendations for subsequent segments of the video file.

The color palette recommendation engine 370 may be in communication with an optional video content generation engine 390. In some embodiments, the video content generation engine 390 may be a part of, or integrated with, the color palette recommendation engine 370. The video content generation engine 390 may be configured to apply the selected color palette recommendation to the video segment, so as to generate a modified video segment. The video content generation engine 390 may be configured to output a modified video file 392 with the selected color palette(s) applied. Accordingly, the video content generation engine 390 may output a modified video file. The video content generation engine 390 may apply the selected filters and/or color palettes to the individual frames of the video segments, and may optionally stitch the video segments together to form a single video file.

Figure 4:
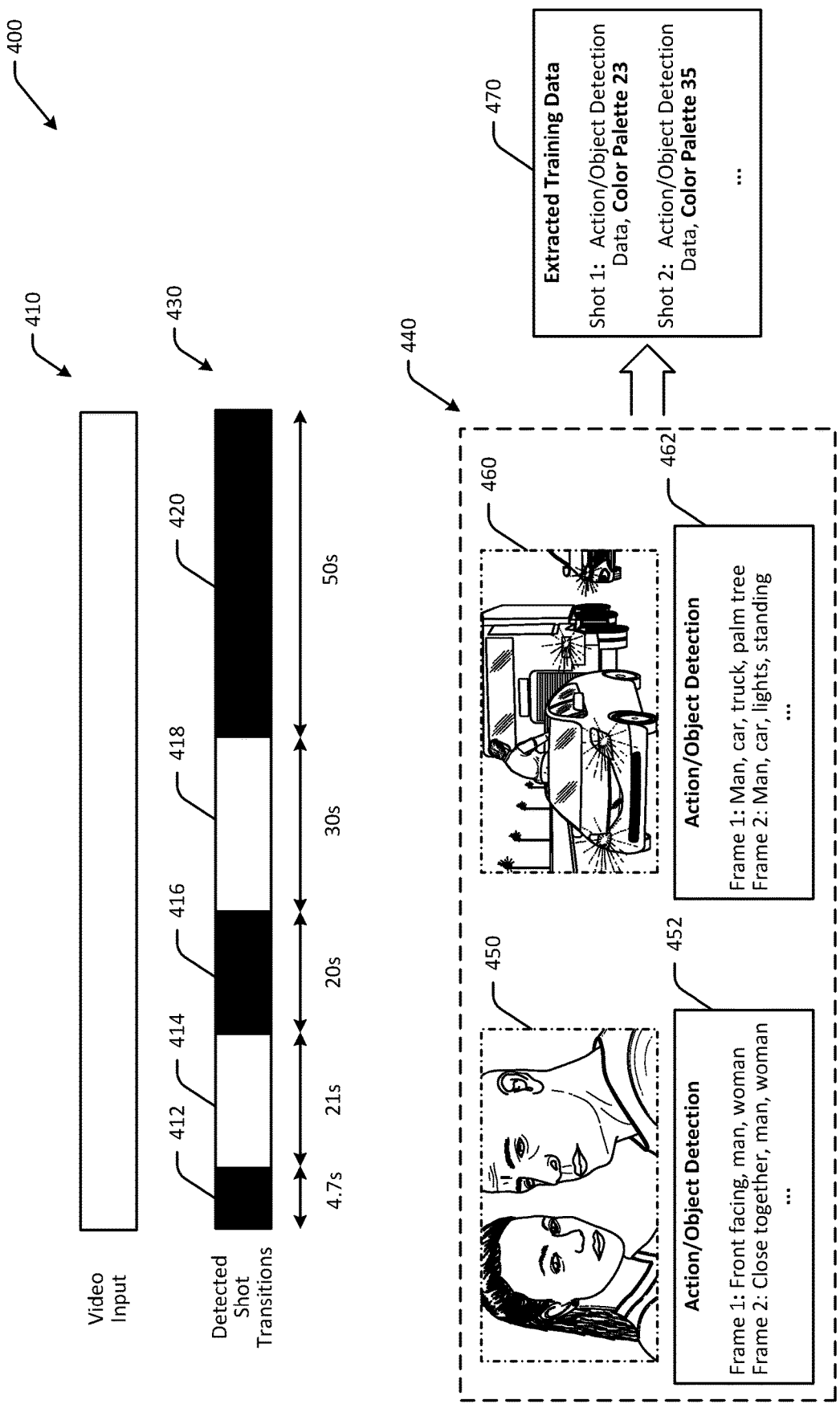
FIG. 4 is a schematic illustration of example shot detection and detection of various characteristics of video content for generation of a training dataset in accordance with one or more example embodiments of the disclosure.

FIG. 4 is a schematic illustration of an example use case 400 of shot detection and detection of various characteristics of video content for generation of a training dataset in accordance with one or more example embodiments of the disclosure. In FIG. 4, content 410 is represented in a bar format and may include a number of different segments. The content may be video content, such as a movie, television show, or other video content. Segments may correspond to certain scenes of the content 410 and may or may not be continuous, and may have different lengths. Segments may be identified using one or more timestamps. The segments of content 410 are illustrated in alternating black and white blocks for illustrative purposes only.

In FIG. 4, the video input 410 may be processed, such as by the content processing engine discussed with respect to FIG. 3, to detect shot transitions 430. For example, the video input 410 may be processed to determine that a first shot transition occurs 4.7 seconds into the video content, or after a first shot 412 of the video content. The first shot 412 may be a first scene of the video content 412. A second shot transition may be determined to occur twenty-one seconds after the first shot transition, or after a second shot 414 of the video content. A third shot transition may be determined to occur twenty seconds after the second shot transition, or after a third shot 416 of the video content. A fourth shot transition may be determined to occur thirty seconds after the third shot transition, or after a fourth shot 418 of the video content. A fifth shot transition may be determined to occur fifty seconds after the fourth shot transition, or after a fifth shot 420 of the video content.

In an example, shot transition detection may be performed by determining a first color histogram for a first frame of the video content, determining a second color histogram for a second frame of the video content, where the second frame is consecutive to the first frame, determining that a distance between the first color histogram and the second color histogram satisfies a shot transition threshold, and determining that the first shot transition occurs at the second frame.

In another example, shot detection may be performed by determining, using one or more video processing algorithms, a start timestamp of the first segment, and determining, using the one or more video processing algorithms, an end timestamp of the first segment, where the first segment corresponds to a scene of the video content.

After the shot transitions are detected, the content processing engine may determine various characteristics of the segment, such as object detection, action detection, facial sentiment detection, cinematographic features, location detection, and/or other characteristics.

For example, the content processing engine may process a portion 440 of the video input 410 that includes a first frame 450 corresponding to the first shot 412 and a second frame 460 corresponding to the second shot 414. The content processing engine may determine, for the first frame 450 and/or the first shot 412 detected object data 452 that includes a man and woman front facing and close together. Similarly, the content processing engine may determine, for the second frame 460 and/or the second shot 414 detected object data 462 that includes a man, a car, a truck, a palm tree, an action of standing, and so forth.

Human pose detection may include object detection, pattern recognition (e.g., human action image recognition, etc.), facial recognition (e.g., facial sentiment detection, etc.), or other image or video processing algorithms. In some embodiments, individual frames or sets of frames may be analyzed to determine whether human action is present.

In some instances, a remote server or a user device may be used to analyze one or more portions of video of a content file to determine whether instances of any predefined objects are present. Predefined objects may be certain objects such as firearms, explosions, needles, drugs, and so forth. Objects may be determined to be present based at least in part on object detection, or other audio, text, image, or video processing algorithms. In some embodiments, individual frames or sets of frames, or portions of text data or audio data, may be analyzed to determine whether any predefined objects are present. Object detection may be performed, in one example, by a remote server. For example, the remote server may determine, using one or more object recognition algorithms, a first object that is present in the first set of frames. The remote server may also determine, using one or more facial recognition algorithms, a gender of a first character that is present in the first set of frames, and may use the determined data to generate a vector representing the first action, as well as detected sounds, detected objects, detected people and/or genders, and so forth.

The detected data for the video input 410 may be used to generate extracted training data 470, which may be used to train one or more neural networks or video processing algorithms to generate color palette recommendations. For example, the extracted data may include the color palette or color filter that was actually applied to the shot, along with the detected features, which can be used to train a model to generate color palette recommendations based on the color palettes previously applied in other content. As a result, a rich training dataset may be generated and may include data regarding manual color palette selections for previously generated content.

Accordingly, the extracted training data 470 may include the detected data output from the video processing, and may also include the detected color palette data. For example, the first shot may be associated with a color palette identifier of 23, the second shot may be associated with a color palette identifier of 35, and so forth.

Figure 5:
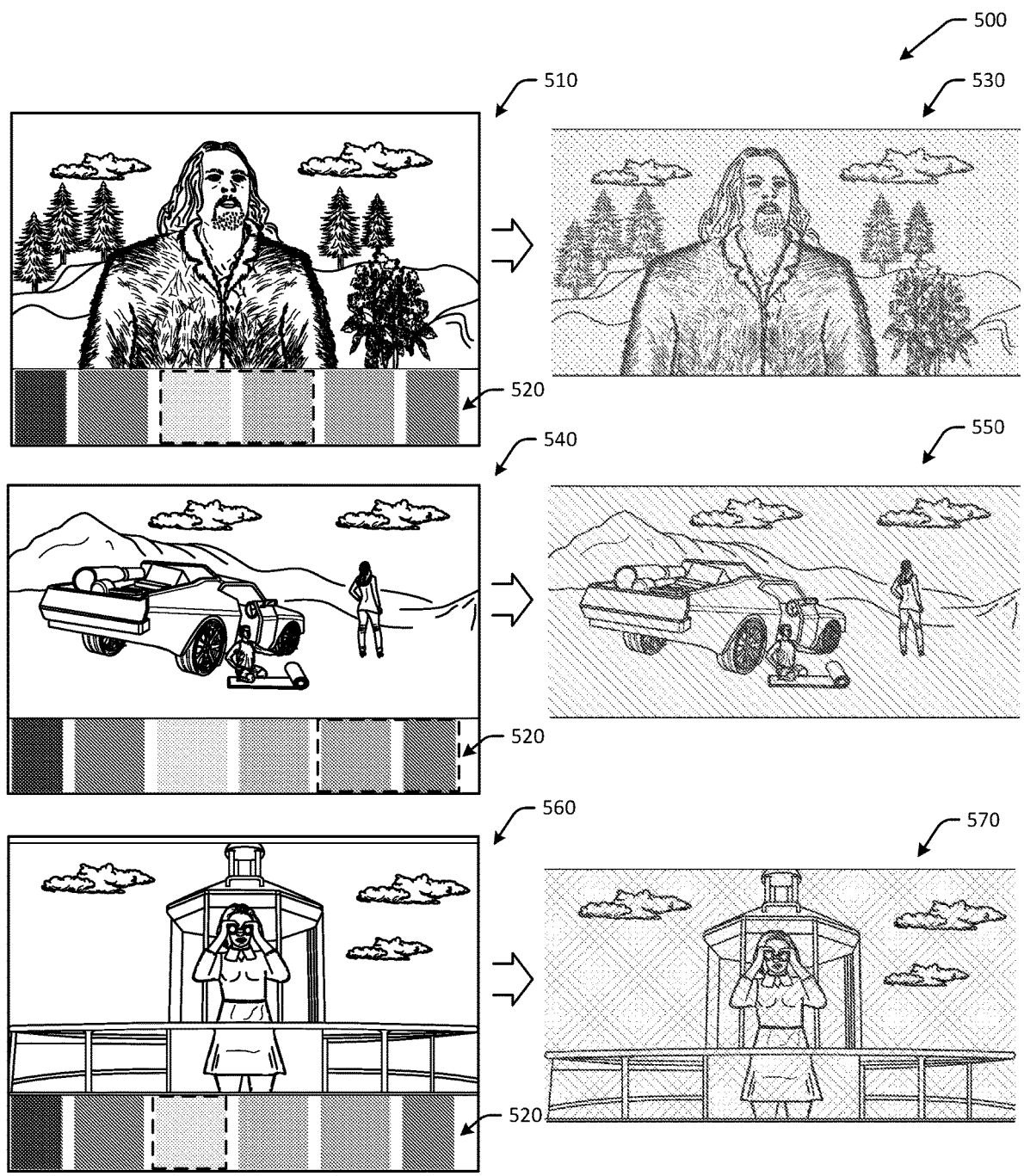
FIG. 5 is a schematic illustration of example filter application to various video segments in accordance with one or more example embodiments of the disclosure.

FIG. 5 is a schematic illustration of example filter application 500 to various video segments in accordance with one or more example embodiments of the disclosure. In FIG. 5, video contents are represented by individual frames. The content may be a movie, television show, or other video content. Segments may correspond to certain scenes or segments of content and may or may not be continuous, and may have different lengths. Segments may be identified using one or more timestamps.

In FIG. 5, a number of frames representing video segments is depicted. The frames and video segments may be part of the same movie or other type of video content, or may be segments from different video content. In some embodiments, recommendations for color palettes may change based at least in part on the color palettes selected for other segments of the same content, so as to provide a theme or cohesiveness of color palettes for the entire video content. In some embodiments, modifications to recommendations may be reflected as changes to confidence scores (e.g., confidence scores may be increased for color palettes related to those selected for other segments of the content, etc.). In some embodiments, color palettes selected for relatively longer video segments in the content may be weighted heavier than selections of color palettes for relatively shorter video segments in the content. As a content producer progresses through segments of the video and selects color palettes from the recommendations, subsequent recommendations may account for the previous selections and an accuracy of the recommendations may be improved.

A first frame 510 illustrated in FIG. 5 may be from a first video segment. The system may analyze the first video segment and may determine various characteristics of the first video segment. For example, the first video segment may be processed using one or more video processing algorithms (e.g., which may include machine learning algorithms and/or neural networks, etc.) to determine objects that appear in the first video segment. Additional video processing may include action detection to determine a first action that occurs in the first video segment, location detection to determine where the first segment takes place (e.g., indoors, outdoors, at a particular location, such as a house or a gym, and so forth), theme detection to determine a theme of the first segment (e.g., themes may be selected from a predetermined set of classifiers and may include options such as romance, action, adventure, drama, etc.), facial sentiment detection to determine a sentiment of the first segment (e.g., facial sentiment may be selected from a predetermined set of classifiers and may include options such as love, anger, happiness, drama, etc.), and/or other types of video processing. Results of some or all of the respective video processing techniques may be determined for each of the video segments. In some instances, video segments may be too short to have meaningful results from each of the processing techniques, and as such, not all video processing results may be used for each video segment.

The output of the various video processing techniques may be combined into a vector. For example, a computer system may generate a vector representing one or more of an object detected in the scene, one or more semantic characteristics of the scene, an action that occurs in the scene, a determined theme of the scene, an indicator of the facial sentiment of an actor during the scene, and/or other features determined or detected in the frames and/or video content.

In some embodiments a size of the shot and/or camera motion during a shot or scene may be determined and used as a feature in the vector. Such features may be cinematographic features and may be used as a factor to determine a color palette recommendation. For example, a computer system may determine, using one or more neural networks, at least one cinematography characteristic of the first set of frames, such as a shot size (e.g., aspect ratio, distance between subject and camera, etc.), camera motion (e.g., closing in, panning, zooming out, etc.), using one or more video processing techniques. The computer system may use output of the video processing to generate a vector, which may include an indicator of the at least one cinematography characteristic.

In the example of FIG. 5, the first frame 510 may be determined to have an outdoor location, with facial sentiment of fear, an object of snow on the ground, and so forth. The computer system may determine, using the vector for the first frame 510 and/or for the corresponding video segment, a set of one or more color palette recommendations 520 for the first frame 510 and/or for the corresponding video segment. For example, the color palette recommendations 520 may include recommendations that are most likely to be selected, as indicated by the dashed rectangular box in FIG. 5. The recommendations may result in the application of a bluish color palette to the first frame 510 and/or to the corresponding video segment. After processing, a processed first frame 530 may be generated and included as part of the video file for the movie or other video content. As a result, the color palette may be automatically applied (and in some cases, applied after a user selection of one of the color palette recommendations), and an updated video file may be generated.

A second frame 540 illustrated in FIG. 5 may be from the same movie or video content as the first frame 510, but may be from a different video segment or shot, such as a second video segment. The system may analyze the second video segment and may determine various characteristics of the second video segment. For example, the first video segment may be processed using one or more video processing algorithms (e.g., which may include machine learning algorithms and/or neural networks, etc.) to determine objects that appear in the second video segment. The output of the various video processing techniques may be combined into a vector. For example, a computer system may generate a vector representing one or more of an object detected in the scene, one or more semantic characteristics of the scene, an action that occurs in the scene, a determined theme of the scene, an indicator of the facial sentiment of an actor during the scene, and/or other features determined or detected in the frames and/or video content. The computer system may use output of the video processing to generate a vector, which may include an indicator of the at least one cinematography characteristic.

In the example of FIG. 5, the second frame 540 may be determined to have a desert location, with facial sentiment of relaxation, an object of a vehicle and sand on the ground, and so forth. The computer system may determine, using the vector for the second frame 540 and/or for the corresponding video segment, a set of one or more color palette recommendations 520 for the second frame 540 and/or for the corresponding video segment. For example, the color palette recommendations 520 may include recommendations that are most likely to be selected, as indicated by the dashed rectangular box in FIG. 5. The recommendations may result in the application of an orange or reddish color palette to the second frame 540 and/or to the corresponding video segment. After processing, a processed second frame 550 may be generated and included as part of the video file for the movie or other video content. As a result, the color palette may be automatically applied (and in some cases, applied after a user selection of one of the color palette recommendations), and an updated video file may be generated.

A third frame 560 illustrated in FIG. 5 may be from the same movie or video content as the first frame 510 and/or the second frame 540, but may be from a different video segment or shot, such as a second video segment. The system may analyze the second video segment and may determine various characteristics of the second video segment. For example, the first video segment may be processed using one or more video processing algorithms (e.g., which may include machine learning algorithms and/or neural networks, etc.) to determine objects that appear in the second video segment. The output of the various video processing techniques may be combined into a vector. For example, a computer system may generate a vector representing one or more of an object detected in the scene, one or more semantic characteristics of the scene, an action that occurs in the scene, a determined theme of the scene, an indicator of the facial sentiment of an actor during the scene, and/or other features determined or detected in the frames and/or video content. The computer system may use output of the video processing to generate a vector, which may include an indicator of the at least one cinematography characteristic.

In the example of FIG. 5, the third frame 560 may be determined to have an outdoor lighthouse location, with facial sentiment of excitement, an object of a lighthouse and binoculars, and so forth. The computer system may determine, using the vector for the third frame 560 and/or for the corresponding video segment, a set of one or more color palette recommendations 520 for the third frame 560 and/or for the corresponding video segment. For example, the color palette recommendations 520 may include recommendations that are most likely to be selected, as indicated by the dashed rectangular box in FIG. 5. The recommendations may result in the application of a bluish or other color palette to the third frame 560 and/or to the corresponding video segment. After processing, a processed third frame 570 may be generated and included as part of the video file for the movie or other video content. As a result, the color palette may be automatically applied (and in some cases, applied after a user selection of one of the color palette recommendations), and an updated video file may be generated.

In the event that all of the frames in the example of FIG. 5 are from the same movie or video content, the color palette selections for earlier shots in the movie may influence recommendations for color palettes of shots later in the movie, so as to provide a cohesive feel to the colors applied to the whole video, and to have a unified color palette. For example, the computer system may determine a second segment of the video content that includes the second frame 540, generate a second vector representing characteristics of the second segment, and generate, using one or more neural networks, the second vector, an optional color palette graph, and the first color palette selection (e.g., the selection for the first frame 510, etc.), a second color palette recommendation for the second segment and/or the second frame 540.

One or more operations of the methods, process flows, or use cases of FIGS. 1-5 may have been described above as being performed by a user device, or more specifically, by one or more program module(s), applications, or the like executing on a device. It should be appreciated, however, that any of the operations of the methods, process flows, or use cases of FIGS. 1-5 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-5 may be described in the context of the illustrative devices, it should be appreciated that such operations may be implemented in connection with numerous other device configurations.

The operations described and depicted in the illustrative methods, process flows, and use cases of FIGS. 1-5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 6:
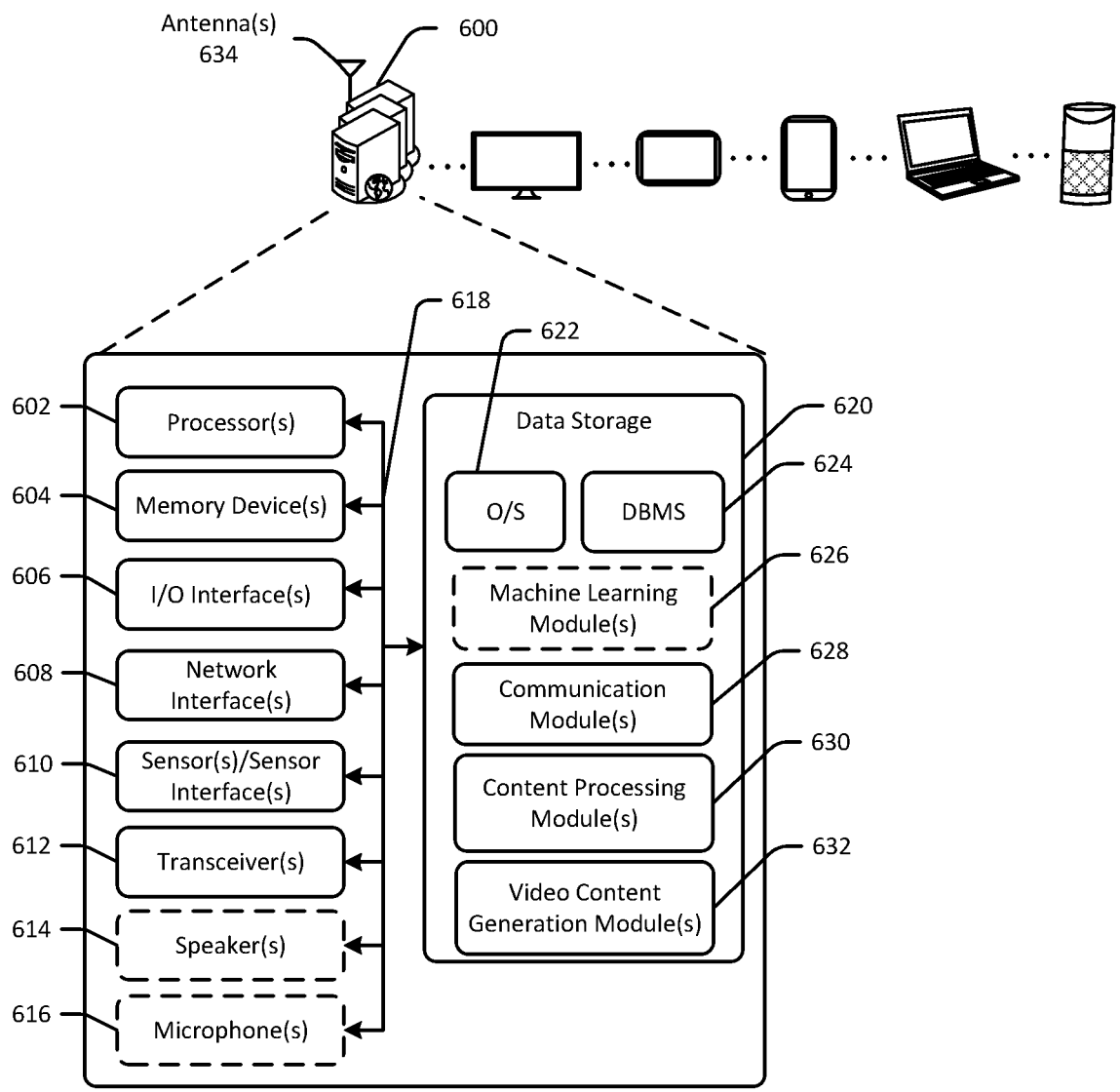
FIG. 6 is a schematic block diagram of an illustrative device in accordance with one or more example embodiments of the disclosure.

FIG. 6 is a schematic block diagram of an illustrative remote server 600 in accordance with one or more example embodiments of the disclosure. The remote server 600 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 600 may correspond to an illustrative device configuration for the devices of FIGS. 1-5.

The remote server 600 may be configured to communicate via one or more networks with one or more servers, search engines, user devices, or the like. In some embodiments, a single remote server or single group of remote servers may be configured to perform more than one type of color palette recommendation generation and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 600 may include one or more processors (processor(s)) 602, one or more memory devices 604 (generically referred to herein as memory 604), one or more input/output (I/O) interface(s) 606, one or more network interface(s) 608, one or more sensors or sensor interface(s) 610, one or more transceivers 612, one or more optional speakers 614, one or more optional microphones 616, and data storage 620. The remote server 600 may further include one or more buses 618 that functionally couple various components of the remote server 600. The remote server 600 may further include one or more antenna(s) 634 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 618 may include at least one of a system bus, a memory bus, an address bus, or a message bus, and may permit exchange of information (e.g., data (including computer-executable code), signaling, etc.) between various components of the remote server 600. The bus(es) 618 may include, without limitation, a memory bus or a memory controller, a peripheral bus, an accelerated graphics port, and so forth. The bus(es) 618 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 604 of the remote server 600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 604 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 604 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 620 may include removable storage and/or non-removable storage including, but not limited to, magnetic storage, optical disk storage, and/or tape storage. The data storage 620 may provide non-volatile storage of computer-executable instructions and other data. The memory 604 and the data storage 620, removable and/or non-removable, are examples of computer-readable storage media (CRSM) as that term is used herein.

The data storage 620 may store computer-executable code, instructions, or the like that may be loadable into the memory 604 and executable by the processor(s) 602 to cause the processor(s) 602 to perform or initiate various operations. The data storage 620 may additionally store data that may be copied to memory 604 for use by the processor(s) 602 during the execution of the computer-executable instructions. Moreover, output data generated as a result of execution of the computer-executable instructions by the processor(s) 602 may be stored initially in memory 604, and may ultimately be copied to data storage 620 for non-volatile storage.

More specifically, the data storage 620 may store one or more operating systems (O/S) 622; one or more database management systems (DBMS) 624; and one or more program module(s), applications, engines, computer-executable code, scripts, or the like such as, for example, one or more optional machine learning module(s) 626, one or more communication module(s) 628, one or more content processing module(s) 630, and/or one or more video content generation module(s) 632. Some or all of these module(s)

may be sub-module(s). Any of the components depicted as being stored in data storage 620 may include any combination of software, firmware, and/or hardware. The software and/or firmware may include computer-executable code, instructions, or the like that may be loaded into the memory 604 for execution by one or more of the processor(s) 602. Any of the components depicted as being stored in data storage 620 may support functionality described in reference to correspondingly named components earlier in this disclosure.

The data storage 620 may further store various types of data utilized by components of the remote server 600. Any data stored in the data storage 620 may be loaded into the memory 604 for use by the processor(s) 602 in executing computer-executable code. In addition, any data depicted as being stored in the data storage 620 may potentially be stored in one or more datastore(s) and may be accessed via the DBMS 624 and loaded in the memory 604 for use by the processor(s) 602 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 6, the datastore(s) may include, for example, user preference information, color graph data, training information, historical color palette selection information, and other information.

The processor(s) 602 may be configured to access the memory 604 and execute computer-executable instructions loaded therein. For example, the processor(s) 602 may be configured to execute computer-executable instructions of the various program module(s), applications, engines, or the like of the remote server 600 to cause or facilitate various operations to be performed in accordance with one or more embodiments of the disclosure. The processor(s) 602 may include any suitable processing unit capable of accepting data as input, processing the input data in accordance with stored computer-executable instructions, and generating output data. The processor(s) 602 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 602 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 602 may be capable of supporting any of a variety of instruction sets.

Referring now to functionality supported by the various program module(s) depicted in FIG. 6, the optional machine learning module(s) 626 may include computer-executable instructions, code, or the like that responsive to execution by one or more of the processor(s) 602 may perform functions including, but not limited to, determining color palette recommendations, determining confidence values, determining color palette selections, determining subsequent recommendations based on previous color palette selections, determining semantic characteristics, determining or detecting actions and/events, generating one or more machine learning models or algorithms, determining or classifying objects or actions, determining frames of content, and the like.

The communication module(s) 628 may include computer-executable instructions, code, or the like that responsive to execution by one or more of the processor(s) 602 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content processing module(s) 630 may include computer-executable instructions, code, or the like that responsive to execution by one or more of the processor(s) 602 may perform functions including, but not limited to, analyzing digital content, extracting frames, determining pixel color values, determining audio content, determining or analyzing audio files, identifying certain portions of content, extracting segments of content, generating video files, applying color filters and/or palettes, and the like.

The video content generation module(s) 632 may include computer-executable instructions, code, or the like that responsive to execution by one or more of the processor(s) 602 may perform functions including, but not limited to, determining video files, applying color palettes and/or filters, generating video files, generating color palette descriptions, modifying playback or presentation speed, determining messages, generating search results, and the like.

Referring now to other illustrative components depicted as being stored in the data storage 620, the O/S 622 may be loaded from the data storage 620 into the memory 604 and may provide an interface between other application software executing on the remote server 600 and hardware resources of the remote server 600. More specifically, the O/S 622 may include a set of computer-executable instructions for managing hardware resources of the remote server 600 and for providing common services to other application programs (e.g., managing memory allocation among various application programs). In certain example embodiments, the O/S 622 may control execution of the other program module(s) to for content rendering. The O/S 622 may include any operating system now known or which may be developed in the future including, but not limited to, any server operating system, any mainframe operating system, or any other proprietary or non-proprietary operating system.

The DBMS 624 may be loaded into the memory 604 and may support functionality for accessing, retrieving, storing, and/or manipulating data stored in the memory 604 and/or data stored in the data storage 620. The DBMS 624 may use any of a variety of database models (e.g., relational model, object model, etc.) and may support any of a variety of query languages. The DBMS 624 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 600 is a mobile device, the DBMS 624 may be any suitable light-weight DBMS optimized for performance on a mobile device.

Referring now to other illustrative components of the remote server 600, the input/output (I/O) interface(s) 606 may facilitate the receipt of input information by the remote server 600 from one or more I/O devices as well as the output of information from the remote server 600 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 600 or may be separate. The I/O devices may further include, for example, any number of peripheral devices such as data storage devices, printing devices, and so forth.

The I/O interface(s) 606 may also include an interface for an external peripheral device connection such as universal serial bus (USB), FireWire, Thunderbolt, Ethernet port or other connection protocol that may connect to one or more networks. The I/O interface(s) 606 may also include a connection to one or more of the antenna(s) 634 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 600 may further include one or more network interface(s) 608 via which the remote server 600 may communicate with any of a variety of other systems, platforms, networks, devices, and so forth. The network interface(s) 608 may enable communication, for example, with one or more wireless routers, one or more host servers, one or more web servers, and the like via one or more of networks.

The antenna(s) 634 may include any suitable type of antenna depending, for example, on the communications protocols used to transmit or receive signals via the antenna(s) 634. Non-limiting examples of suitable antennas may include directional antennas, non-directional antennas, dipole antennas, folded dipole antennas, patch antennas, multiple-input multiple-output (MIMO) antennas, or the like. The antenna(s) 634 may be communicatively coupled to one or more transceivers 612 or radio components to which or from which signals may be transmitted or received.

As previously described, the antenna(s) 634 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 634 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 634 may be configured to transmit or receive radio frequency signals within any suitable frequency range forming part of the unlicensed portion of the radio spectrum.

The antenna(s) 634 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 612 may include any suitable radio component(s) for—in cooperation with the antenna(s) 634—transmitting or receiving radio frequency (RF) signals in the bandwidth and/or channels corresponding to the communications protocols utilized by the remote server 600 to communicate with other devices. The transceiver(s) 612 may include hardware, software, and/or firmware for modulating, transmitting, or receiving—potentially in cooperation with any of antenna(s) 634—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 612 may further include hardware, firmware, or software for receiving GNSS signals. The transceiver(s) 612 may include any known receiver and baseband suitable for communicating via the communications protocols utilized by the remote server 600. The transceiver(s) 612 may further include a low noise amplifier (LNA), additional signal amplifiers, an analog-to-digital (A/D) converter, one or more buffers, a digital baseband, or the like.

The sensor(s)/sensor interface(s) 610 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 614 may be any device configured to generate audible sound. The optional microphone(s) 616 may be any device configured to receive analog sound input or voice data.

It should be appreciated that the program module(s), applications, computer-executable instructions, code, or the like depicted in FIG. 6 as being stored in the data storage 620 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 600, and/or hosted on other computing device(s) accessible via one or more networks, may be provided to support functionality provided by the program module(s), applications, or computer-executable code depicted in FIG. 6 and/or additional or alternate functionality. Further, functionality may be modularized differently such that processing described as being supported collectively by the collection of program module(s) depicted in FIG. 6 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 6 may be implemented, at least partially, in hardware and/or firmware across any number of devices.

It should further be appreciated that the remote server 600 may include alternate and/or additional hardware, software, or firmware components beyond those described or depicted without departing from the scope of the disclosure. More particularly, it should be appreciated that software, firmware, or hardware components depicted as forming part of the remote server 600 are merely illustrative and that some components may not be present or additional components may be provided in various embodiments. While various illustrative program module(s) have been depicted and described as software module(s) stored in data storage 620, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to memory, a movie file comprising video data;
    extracting a first video segment from the video data, the first segment comprising a first frame and a second frame;
    determining, using a first neural network, a first action that occurs during the first segment;
    determining, using one or more object recognition algorithms, a first object that appears in the first frame;
    determining, using a video processing algorithm, a first semantic characteristic of the first segment;
    generating, using a second neural network, a first vector representing the first action, the first object, and the first semantic characteristic;
    generating, using a third neural network and a color palette graph, a first color palette recommendation for a first color filter palette to apply to the first segment based at least in part on the first vector;
    generating, using the third neural network and the color palette graph, a second color palette recommendation for a second color filter palette to apply to the first segment based at least in part on the first vector;
    determining a selection of the second color palette recommendation; and
    generating a movie file comprising the second color filter palette applied to the first segment.

2. The method of claim 1, further comprising:
    determining a second segment of the video data;
    generating a second vector representing characteristics of the second segment; and
    generating, using the third neural network and the second vector, and the second color palette recommendation, a third color palette recommendation for the second segment.

3. The method of claim 1, further comprising:
    determining user preferences associated with a user account;
    wherein generating the first color palette recommendation for the first color filter palette to apply to the first segment based at least in part on the first vector comprises generating the first color palette recommendation for the first color filter palette to apply to the first segment based at least in part on the first vector and the user preferences.

4. The method of claim 1, further comprising:
    generating an updated training dataset based at least in part on the selection of the second color palette recommendation; and
    retraining the third neural network using the updated training dataset.

5. A method comprising:
    determining, by one or more computer processors coupled to memory, a first segment of video content, the first segment comprising a first set of frames;
    determining, using a first video processing algorithm, a first object that is present in the first set of frames;
    determining, using a second video processing algorithm, a first semantic characteristic of the first segment;
    generating a first vector representing the first object and the first semantic characteristic; and
    generating, using a first neural network and the first vector, a first color palette recommendation for the first segment, wherein selection of the first color palette recommendation causes a color filter to be applied to the first set of frames.

6. The method of claim 5, further comprising:
    determining a selection of the first color palette recommendation; and
    generating a video file comprising a second set of frames that have the color filter applied to the first set of frames.

7. The method of claim 6, further comprising:
    determining a second segment of the video content;
    generating a second vector representing characteristics of the second segment; and
    generating a second color palette recommendation for the second segment based at least in part on the selection of the first color palette recommendation.

8. The method of claim 5, further comprising:
    determining, using a third video processing algorithm, a start timestamp of the first segment; and
    determining, using the third video processing algorithm, an end timestamp of the first segment;
    wherein the first segment corresponds to a scene of the video content.

9. The method of claim 5, further comprising:
    generating, using the first neural network, the first vector, and a color palette graph, a second color palette recommendation for the first segment;
    generating, using the first neural network, the first vector, and the color palette graph, a third color palette recommendation for the first segment; and
    causing presentation of the first color palette recommendation, the second color palette recommendation, and the third color palette recommendation at a user interface.

10. The method of claim 5, further comprising:
    determining user preferences associated with a user account;
    wherein generating the first color palette recommendation for the first segment comprises generating the first color palette recommendation for the first segment using the first neural network, the first vector, and the user preferences.

11. The method of claim 5, further comprising:
    determining a second segment of the video content;
    generating a second vector representing characteristics of the second segment; and
    generating, using the first neural network, the second vector, and the first color palette recommendation, a second color palette recommendation for the second segment.

12. The method of claim 5, further comprising:
    generating a confidence score for the first color palette recommendation; and
    determining that the confidence score satisfies a confidence score threshold.

13. The method of claim 5, further comprising:
determining, using a third video processing algorithm, a first action that occurs in the first set of frames;
wherein generating the first vector comprises generating the first vector representing the first object, the first semantic characteristic, and the first action.

14. The method of claim 5, further comprising:
determining, using a third video processing algorithm, a theme of the first set of frames;
wherein generating the first vector comprises generating the first vector representing the first object, the first semantic characteristic, and the first theme.

15. The method of claim 5, further comprising:
determining, using a third video processing algorithm, facial sentiment associated with a human face that appears in the first set of frames;
wherein generating the first vector comprises generating the first vector representing the first object, the first semantic characteristic, and an indicator of the facial sentiment.

16. The method of claim 5, further comprising:
determining, using a second neural network, at least one cinematography characteristic of the first set of frames;
wherein generating the first vector comprises generating the first vector representing the first object, the first semantic characteristic, and an indicator of the at least one cinematography characteristic.

17. A system comprising:
memory configured to store computer-executable instructions; and
at least one computer processor configured to access the memory and execute the computer-executable instructions to:
determine a first segment of video content, the first segment comprising a first set of frames;
determine, using a first video processing algorithm, a first object that is present in the first set of frames;
determine, using a second video processing algorithm, a first semantic characteristic of the first segment;
generate a first vector representing the first object and the first semantic characteristic; and
generate, using a first neural network and the first vector, a first color palette recommendation for the first segment, wherein selection of the first color palette recommendation causes a color filter to be applied to the first set of frames.

18. The system of claim 17, wherein the at least one processor is further configured to access the memory and execute the computer-executable instructions to:
determine a selection of the first color palette recommendation; and
generate a second set of frames comprising the color filter applied to the first set of frames.

19. The system of claim 18, wherein the at least one processor is further configured to access the memory and execute the computer-executable instructions to:
determine a second segment of the video content;
generate a second vector representing characteristics of the second segment; and
generate a second color palette recommendation for the second segment based at least in part on the selection of the first color palette recommendation.

20. The system of claim 17, wherein the at least one processor is further configured to access the memory and execute the computer-executable instructions to:
determine, using a third video processing algorithm, a start timestamp of the first segment; and
determine, using the third video processing algorithm, an end timestamp of the first segment;
wherein the first segment corresponds to a scene of the video content.

* * * * *